United States Patent [19]
Tanaka et al.

[11] Patent Number: 5,432,013
[45] Date of Patent: Jul. 11, 1995

[54] SLIDING BEARING FOR LIGHT ALLOY HOUSING

[75] Inventors: Tadashi Tanaka, Konan; Masaaki Sakamoto, Nagoya; Koichi Yamamoto, Komaki; Yoshiaki Sato, Gifu; Tohru Kato, Seto, all of Japan

[73] Assignee: Daido Metal Co., Ltd., Nagoya, Japan

[21] Appl. No.: 112,263

[22] Filed: Aug. 27, 1993

[30] Foreign Application Priority Data

Aug. 28, 1992 [JP] Japan .................. 4-229798

[51] Int. Cl.⁶ ............................................. F16C 33/12
[52] U.S. Cl. ................................. 428/643; 428/645; 428/652; 384/912
[58] Field of Search .............. 428/643, 644, 645, 646, 428/652, 674, 675; 384/912

[56] References Cited

U.S. PATENT DOCUMENTS

| | | | |
|---|---|---|---|
| 2,386,951 | 10/1945 | Howe | 428/675 |
| 2,569,149 | 9/1951 | Brennan | 428/652 |
| 2,766,195 | 10/1956 | Combs et al. | 428/652 |
| 2,911,708 | 11/1959 | Fike et al. | 428/652 |
| 3,810,287 | 5/1974 | Pryor et al. | 428/652 |
| 4,206,268 | 6/1980 | Roemer et al. | 428/675 |
| 5,112,416 | 5/1992 | Tanaka et al. | 384/912 |
| 5,185,216 | 2/1993 | Tanaka et al. | 384/912 |

FOREIGN PATENT DOCUMENTS

| | | | |
|---|---|---|---|
| 54-158363 | 12/1979 | Japan | 428/652 |
| 597113 | 8/1945 | United Kingdom . | |
| 692190 | 9/1950 | United Kingdom . | |

Primary Examiner—John Zimmerman
Attorney, Agent, or Firm—Browdy and Neimark

[57] ABSTRACT

A sliding bearing has a back metal made of a copper alloy which has a high followability with respect to deformation of a light alloy housing, and with this construction, the sliding bearing is excellent in fretting resistance and migration resistance. The multi-layer sliding bearing for a light alloy housing includes an aluminum alloy bearing layer, and a back metal layer, the back metal layer being made of a copper alloy which has a thermal expansion coefficient of not less than $15 \times 10^{-6}/°C.$, a 0.2% yield strength of not less than 295 N/mm² and a heat transfer coefficient of not less than 0.40 Cal/cm·sec·°C. A Pb-alloy overlay layer can be formed on the bearing layer. A bonding layer can be formed between the bearing layer and the back metal layer. A flash plating layer can be formed on an entire surface of the bearing. When a large interference is not obtained, or under sever conditions as when the temperatures of the bearing and the lubricating oil rise in a high-speed range of the internal combustion engine or as when the inertia force of the housing increases, an excellent bearing performance is achieved by the sliding bearing of the present invention.

20 Claims, 3 Drawing Sheets

☒ : VARIATIONS IN TEST RESULTS

☒ : VARIATIONS IN TEST RESULTS

SLIDING BEARING FOR LIGHT ALLOY HOUSING

BACKGROUND OF THE INVENTION

This invention relates to a sliding bearing for a light alloy housing used in an internal combustion engine of an automobile or the like which bearing comprises a back metal layer of a copper alloy and an aluminum alloy bearing layer.

There are already known various kinds of sliding bearings. Generally, an aluminum alloy sliding bearing comprises a bearing layer of Al—Sn alloy, Al—Pb alloy, Al—Zn alloy or the like formed on a back metal of JIS 3141SPCC, SAE1010 or the like. Most of the back metals used in such a sliding bearing are made of low-carbon steel whose carbon content is usually not more than 0.20%.

A housing for such a bearing is made of cast steel, cast iron, carbon steel or alloyed steel, and is analogous in thermal expansion coefficient to the back metal of the bearing, and therefore even when the temperature rises during an operation, the bearing and the housing are kept in intimate contact with each other with no gap developing therebetween, thus posing no particular problem.

With respect to the characteristics of the conventional sliding bearings, attention has been directed mainly to the properties of the alloy bearing layer, and as regards the back metal, its workability and bonding property have drawn attention.

Recently, however, in view of an energy-saving design and a lightweight design of an internal combustion engine of an automobile, there is an increasing tendency that an aluminum alloy is used to form an engine block, a connecting rod and so on.

Where the housing for the bearing is thus made of an aluminum alloy, the bearing having the conventional back metal of steel is greatly different in thermal expansion coefficient from the housing, and therefore the close contact between the bearing and the housing fails to be maintained at elevated temperatures, so that damage such as fatigue and seizure due to fretting (which means a surface damage developing when a slight relative motion is periodically repeated between two contact surfaces) or migration (which means a phenomenon that Cu-plating, flash-plating and carbide of oil concentrate locally as a result of a periodic relative motion) develops. On the other hand, there has been another problem that damage such as seizure has occurred very frequently under severe conditions of use, as at a high engine speed obtained as a result of a high-performance design of the engine.

An attempt has been made to increase an interference so as to improve the condition of close contact of the bearing with the housing at high temperatures or under a high load; however, the bearing having the conventional back metal of low-carbon steel is low in strength, and when attaching the bearing with a high assembling stress, it deforms beyond its elastic limit to be buckled. Besides, such a bearing has a low heat transfer coefficient, and is inferior in heat dissipation, and therefore is not entirely satisfactory in seizure resistance.

SUMMARY OF THE INVENTION

It is an object of this invention to provide a novel aluminum alloy sliding bearing which can be suitably used with a light alloy housing (which is represented by the use of an aluminum block to achieve a compact, lightweight design), can deal with a high-temperature condition (that is, has a high followability with respect to the deformation of the housing) occurring due to a high-speed and high-engine speed operation in a high-performance engine, and besides is excellent in fretting resistance, migration resistance and seizure resistance with the use of a back metal made of a copper alloy excellent in heat dissipation.

In the present invention, in order that a sliding bearing can be suitably used with a light alloy housing and also in order to prevent damage (e.g. fatigue and seizure) from occurring due to a high temperature and a high load in the engine of a high performance design, there is used a back metal of a copper alloy which is higher in thermal expansion coefficient and heat transfer coefficient than a back metal of steel, and has a sufficient strength to serve as the back metal.

More specifically, according to the present invention, there is provided a multi-layer sliding bearing for a light alloy housing, comprising an aluminum alloy bearing layer, and a back metal layer, the back metal layer being made of a copper alloy which has a thermal expansion coefficient of not less than $15 \times 10^{-6}$/°C., a 0.2% yield strength of not less than 295 N/mm$^2$ and a heat transfer coefficient of not less than 0.40 Cal/cm•sec•°C.

The bearing layer may be made of one of an Al—Sn alloy, an Al—Zn alloy and an Al—Pb alloy.

The multi-layer sliding bearing may further comprise an intermediate bonding layer interposed between the bearing layer and the copper alloy back metal layer, the intermediate bonding layer being made of aluminum or an aluminum alloy.

The multi-layer sliding bearing may further comprise another intermediate bonding layer interposed between the bearing layer and the copper alloy back metal layer, the intermediate bonding layer being made of Ni or a Ni alloy.

A Pb-alloy overlay layer may be formed on a surface of the bearing layer, the Pb-alloy overlay layer containing at least one kind selected from the group consisting of Sn, In, Cu and Sb, and a total content of the at least one component being 2% to 30%.

A flash plating layer having a thickness of 0.1 μm to 10 μm may be formed on an entire surface of the sliding bearing, the flash plating layer being made of Sn, Pb or an alloy thereof.

The reasons for the limitations in the appended claims, as well as operations and effects thereof, will now be described.

(1) The back metal of a copper alloy which has a thermal expansion coefficient of not less than $15 \times 10^{-6}$/°C., a 0.2% yield strength of not less than 295 N/mm$^2$ and a heat transfer coefficient of not less than 0.40 Cal/cm•sec•°C.

(i) With respect to back metal materials used in the conventional sliding bearings, importance has been attached to a plastic workability obtainable when forming the bearing, for example, into a half-split configuration or a flanged configuration, and most of such back metal materials are low-carbon steel which has a carbon content of not more than 0.20% and has a low deformation resistance.

The bearing for a light alloy housing need to have an increased interference, when attaching the bearing to the housing, in order to enhance the followability of the bearing for the housing. At this time, the bearing having a low strength, that is, the above-mentioned low-carbon steel having a carbon content of not more than 0.20%, buckles under an assembling stress to yield.

Therefore, the 0.2% yield strength of not less than 295 N/mm2 is necessary.

If the thermal expansion coefficient is less than $15 \times 10^{-6}/°C.$, the difference of it from that of the aluminum housing is large, so that the interference is decreased at high temperatures, which causes fretting or migration.

(ii) In an engine of the high engine speed-type, under the influence of frictional heat, the temperature of the bearing as well as the temperature of oil tends to rise to reduce the thickness of an oil film, and also to lower the wear resistance of the overlay. Therefore, in addition to the conventional bearing properties, it is important to efficiently dissipate the heat from the bearing. The bearing having the copper alloy back metal of a high heat transfer coefficient is excellent in heat-dissipating property, and therefore overcomes the above-mentioned problem.

If the heat transfer coefficient is less than 0.40 Cal/cm•sec•°C., a satisfactory effect is not obtained.

Examples of copper alloy having such a high thermal expansion coefficient and such a high heat transfer coefficient include a Cu—Cr alloy, a Cu—Cd alloy, a Cu—Zr alloy, a Cu—Fe—P—Mg alloy, a Cu—Fe—P—Zn alloy, a Cu—Fe—Co—P—Sn alloy and a Cu—Ni—Si—Mg alloy. However, so far as the necessary properties of the copper alloy are satisfied, its composition is not limited.

(2) Pb-alloy overlay layer

If the total content of Sn, In, Cu and Sb in the Pb-alloy overlay layer for the sliding bearing is less than 2 wt. %, the mechanical strength (e.g. hardness and tensile strength) is inferior, and also is inferior in corrosion resistance to an organic acid occurring when lubricating oil is deteriorated.

In contrast, if this content exceeds 30 wt. %, the mechanical strength is greatly lowered particularly in a temperature range of 100°~150° C. in which the sliding bearing is used. Therefore, the total content of the above metals in the Pb-alloy overlay is limited to 2~30 wt. %, and preferably 5~25 wt. %.

Generally, the Pb-alloy overlay is formed by electroplating, but may be formed by any other suitable method such as sputtering. Thus, the method of forming this overlay is not limited.

(3) The flash plating having a thickness of 0.1~10 μm

The main purpose of the flash plating is to provide a rust-preventing property and an initial compatibility. If its thickness is less than 0.1 μm, a satisfactory effect is not obtained, and if its thickness is more than 10 μm, it causes adverse effects rather than enhances the intended effect, and may cause migration.

DESCRIPTION OF THE INVENTION

Figure 1:
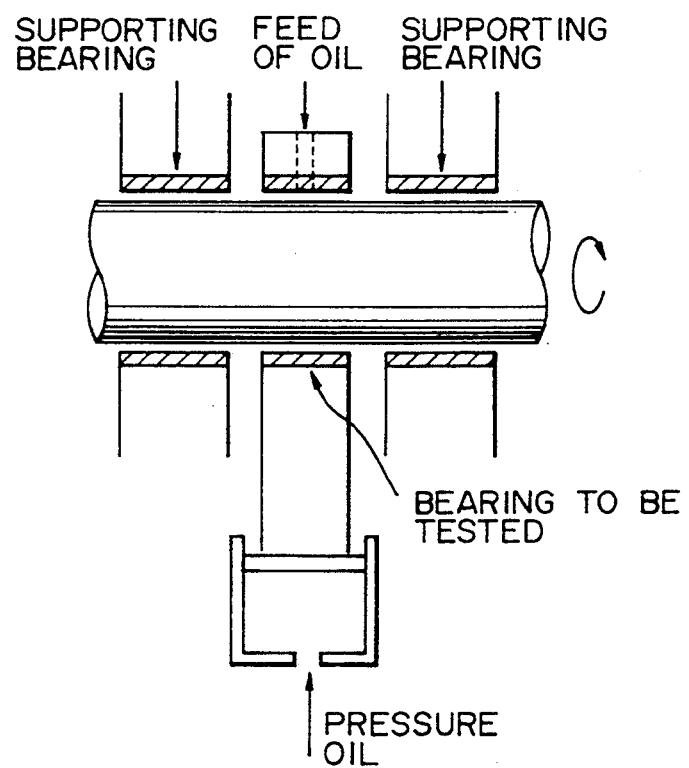
FIG. 1 is a cross-sectional view showing parts used in a method of carrying out a high-speed DS-type seizure test.

The present invention will now be illustrated by way of the following Examples.

EXAMPLE 1

Each of bearing layer-forming alloys having respective compositions shown in Table 1 was melted at 700°~800° C., and was cast by continuous casting into a billet having a thickness of 26 mm and a width of 270 mm.

The cast billet was annealed at 350°~450° C., and then the surface of the billet was cut off, and then the billet was rolled. Then, this rolled product was repeatedly annealed and rolled to be finished into a strip having a thickness of 1 mm. Then, the strip was pressure-bonded by rolling to a back metal (Cu—Cr alloy strip, Cu—Fe—Zn—P alloy strip, and SPCC steel strip (comparative material)) through an aluminum intermediate layer to provide a bimetal material. Then, the bimetal material was subjected to a heat treatment, and then was formed by pressing and machining into a semi-circular bearing (Products of the present invention: Sample Nos. 1 to 3 and 8 to 10; Conventional products: Sample Nos. 15 to 17). The outer diameter of the semi-circular bearing was 56 mm, and the thickness of the back metal was 1.2 mm, and the thickness of the intermediate bonding layer was 0.05 mm, and the thickness of the alloy bearing layer was 0.25 mm.

EXAMPLE 2

Each of bearing layer-forming alloys having respective compositions shown in Table 1 was formed by powder compacting and extrusion into an alloy strip having a thickness of 1 mm. This alloy strip was repeatedly rolled and annealed to be finished into predetermined dimensions. Then, the alloy strip was pressure-bonded by rolling to a back metal through an aluminum intermediate layer to provide a bimetal material. Then, the bimetal material was subjected to a heat treatment, and then was formed by pressing and machining into a semi-circular bearing (Products of the present invention: Sample Nos. 4, 5, 11 and 12; Conventional products: Sample Nos. 18 and 19). This semi-circular bearing had the same dimensions as the semi-circular bearing of Example 1 had.

EXAMPLE 3

Cast billets were prepared according to the same procedure of the above Example 1, and each billet was repeatedly annealed and rolled to be finished into a strip having predetermined dimensions. Then, the strip was pressure-bonded by rolling to a Ni—plated back metal to provide a bimetal material. Then, the bimetal material was subjected to a heat treatment, and then was formed by pressing and machining into a semi-circular bearing (Products of the present invention: Sample Nos. 6, 7, 13 and 14; Conventional products: Sample Nos. 20 and 21). This semi-circular bearing had the same dimensions as the semi-circular bearing of Example 1 had.

EXAMPLE 4

An overlay surface layer having a thickness of 20 μm was formed by conventional electroplating on a surface of each of semicircular bearings prepared by the methods of the above Examples 1 to 3, thereby providing a final product (semi-circular bearing) (Products of the present invention: Sample Nos. 6, 7, 13 and 14; Conventional products: 20 and 21). The thus obtained semi-circular bearing had the same dimensions as the semi-circular bearing of Example 1 had.

Test Example 1

Various properties, such as a tensile strength and a thermal expansion coefficient, of the copper alloy strips and the steel strips used in the above Examples were examined. Results thereof are shown in Table 2.

Test Example 2

In order to compare change in characteristics (interference, bearing stress and so on) of the bearings depending on the material of a housing and a temperature change, there is shown in Table 3 an example of calculation in which Pr (pressure in the radial direction) is 1 at 20° C. As is clear from the calculation results in Table 3, although, in a case of a steel housing, no change occurs in a bearing having a conventional steel back metal, the interference, the bearing stress and so on increase with a temperature rise in bearings having a copper alloy back metal.

On the other hand, with respect to an aluminum housing, the interference and the bearing stress both decrease with a temperature rise, and the interference of a bearing with a steel back metal at 150° C. is half of that obtained at 20° C., so that it fails to perform the function of a bearing. On the other hand, bearings with a copper alloy back metal still have a sufficient interference even at 150° C., and therefore are quite advantageous particularly for the aluminum housing.

Test Example 3

Figure 2:
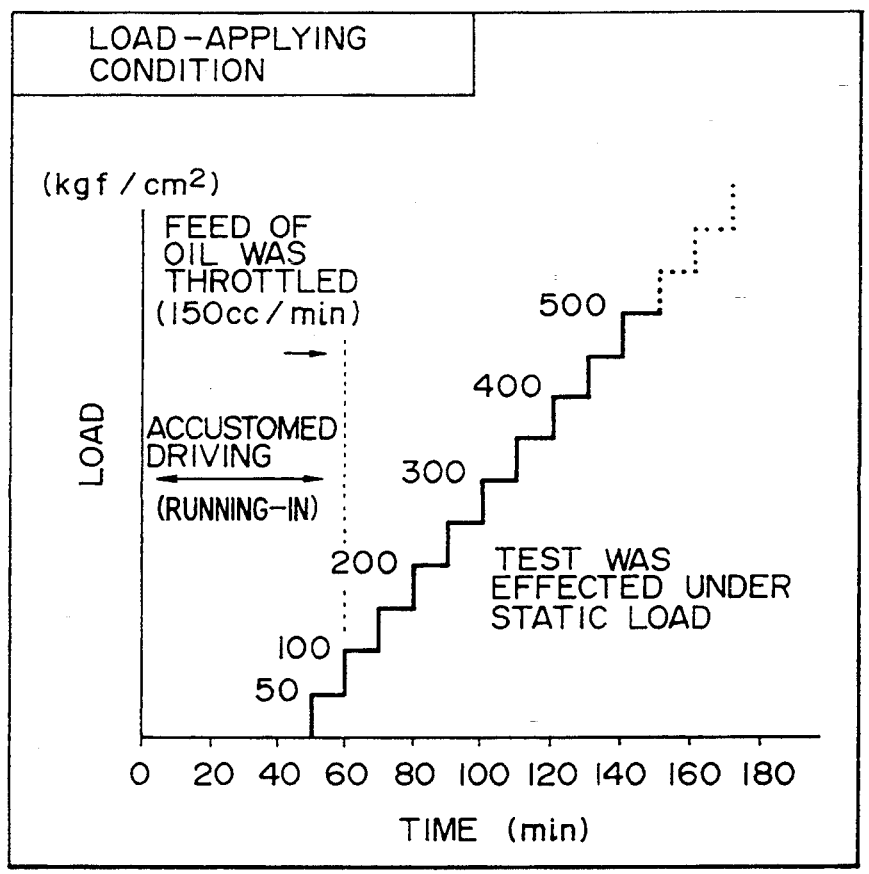
FIG. 2 is a graph showing load-applying conditions in the high-speed DS-type seizure test.

In order to compare seizure resistances under a high-speed condition, a comparative test was conducted using a high-speed seizure testing machine. Conditions of this test are shown in Table 4, and the manner of conducting this seizure test is shown in FIG. 1, and a load-applying condition in the seizure test is shown in FIG. 2.

The testing machine was first run in for one hour, and was operated in such a manner that a static load was cumulatively increased with lubricating oil fed at a rate of 150 ml/min, and it was judged that seizure occurred when the temperature of the rear surface of the bearing exceeded 200° C. or when a belt slipped as a result of a torque change. Results of the test, that is, bearing pressures before the occurrence of seizure (i.e., the maximum bearing pressures not causing seizure) are shown in FIG. 3.

Figure 3:
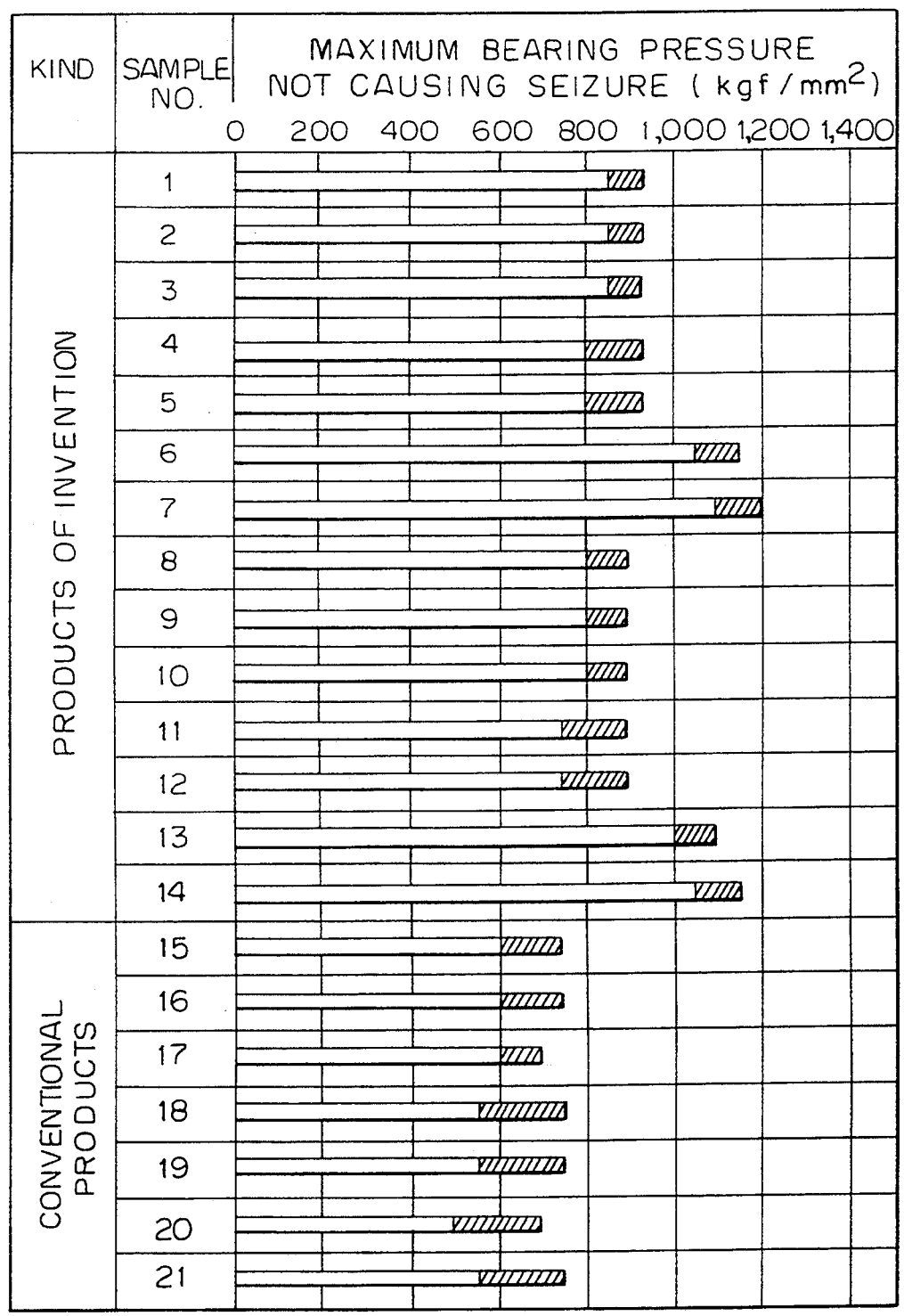
FIG. 3 is a graph showing the results of high-speed DS seizure test.

As is clear from the test results in FIG. 3, the anti-seizure property of the products of the present invention are greatly improved particularly in a high-speed range, as compared with the conventional products.

As is clear from the test results of Table 3 and FIG. 3, the sliding bearing materials of the present invention, which form a bearing for use with a light alloy housing (aluminum alloy housing) and for use in a high-speed engine, are far superior in various respects to the conventional products (comparative materials).

More specifically, with respect to the light alloy housing, the sliding bearing materials of the present invention are excellent in ability of absorbing deformation of the housing since they have a high thermal expansion coefficient. Also, with respect to the high-speed engine, the sliding bearing materials of the present invention are quite effective in restraining the temperature rise of the bearing and the lubricating oil since they have a high heat transfer coefficient. Therefore, the bearings of the present invention perform their function safely, and the advantageous effects of the present invention are clear.

It will be readily appreciated from the foregoing that the sliding bearings of the present invention having the copper alloy back metal achieve an excellent performance particularly when a large interference is not obtained with respect to the light alloy housing, and also can exhibit excellent seizure resistance, fatigue resistance and fretting resistance under severe conditions as when the temperatures of the bearing and the lubricating oil rise in a high-speed range of the internal combustion engine or as when the inertia force of the housing increases. These excellent performances are not achieved by the conventional multi-layer sliding bearings.

TABLE 1

| Kind | Sample No. | Back metal | Sample bearings Intermediate bonding layer | Alloy bearing layer (numeral value - weight %) | Over layer |
| --- | --- | --- | --- | --- | --- |
| Products of invention | 1 | Cu—1.15% Cr | Al | Al—20Sn—1Cu | None |
| | 2 | " | Al | Al—17Sn—0.8Cu—1.7Pb—0.3Sb | none |
| | 3 | " | Al | Al—12Sn—2.5Si—0.7Cu—1.7Pb | none |
| | 4 | " | Al | Al—10Pb—5Sn—2.5Si—1Cu | none |
| | 5 | " | Al | Al—8Pb—3Sn—3Si—0.8Cu | none |
| | 6 | " | Ni | Al—3.5Zn—3Si—0.8Cu—1Pb | Pb—10*Sn |
| | 7 | " | Ni | Al—3.5Zn—3Si—0.8Cu—1Pb | Pb—5Sn—7In |
| | 8 | Cu—2.35% Fe—0.12Zn—0.07% P | Al | Al—20Sn—1Cu | none |
| | 9 | Cu—2.35% Fe—0.12Zn—0.07% P | Al | Al—17Sn—0.8Cu—1.7Pb—0.3Sb | none |
| | 10 | Cu—2.35% Fe—0.12Zn—0.07% P | Al | Al—12Sn—2.5Si—0.7Cu—1.7Pb | none |
| | 11 | Cu—2.35% Fe—0.12Zn—0.07% P | Al | Al—10Pb—5Sn—2.5Si—1Cu | none |
| | 12 | Cu—2.35% Fe—0.12Zn—0.07% P | Al | Al—8Pb—3Sn—3Si—0.8Cu | none |
| | 13 | Cu—2.35% Fe—0.12Zn—0.07% P | Ni | Al—3.5Zn—3Si—0.8Cu—1Pb | Pb—10Sn |
| | 14 | Cu—2.35% Fe—0.12Zn—0.07% P | Ni | Al—3.5Zn—3Si—0.8Cu—1Pb | Pb—5Sn—7In |
| Conventional products | 15 | STEEL (0.12% C) | Al | Al—20Sn—1Cu | none |
| | 16 | STEEL (0.12% C) | Al | Al—17Sn—0.8Cu—1.7Pb—0.3Sb | none |
| | 17 | STEEL (0.12% C) | Al | Al—12Sn—2.5Si—0.7Cu—1.7Pb | none |

TABLE 1-continued

| Kind | Sample No. | Back metal | Sample bearings Intermediate bonding layer | Alloy bearing layer (numeral value - weight %) | Over layer |
|---|---|---|---|---|---|
| | 18 | STEEL (0.12% C) | Al | Al—10Pb—5Sn—2.5Si—1Cu | none |
| | 19 | STEEL (0.12% C) | Al | Al—8Pb—3Sn—3Si—0.8Cu | none |
| | 20 | STEEL (0.12% C) | Ni | Al—3.5Zn—3Si—0.8Cu—1Pb | Pb—10Sn |
| | 21 | STEEL (0.12% C) | Ni | Al—3.5Zn—3Si—0.8Cu—1Pb | Pb—5Sn—7In |

*Weight %

TABLE 2

Various properties

| Kind of back metals (wt %) | Tensile strength N/mm$^2$ | 0.2% yield strength N/mm$^2$ | Thermal expansion coefficient × 10$^{-6}$/°C. | Heat transfer coefficient Cal/cm · sec °C. |
|---|---|---|---|---|
| Cu—1.15% Cr | 580 | 550 | 17.8 | 0.864 |
| Cu—2.35% Fe—0.12% Zn—0.07% P | 540 | 465 | 17.4 | 0.625 |
| STEEL (0.12% C) | 540 | 500 | 12.0 | 0.140 |

TABLE 3

Examles of calculation of interference when the value of Pr is 1 at 20° C.
(Examples of charge due to temperature)

| No. | Material of back metal (wt %) | Material of housing | Item | 20° C. | 100° C. | 150° C. |
|---|---|---|---|---|---|---|
| 1 | STEEL (0.12% C) | STEEL | δ | 0.0676 | 0.0676 | 0.0676 |
| | | | σ$_B$ | 23.78 | 23.78 | 23.78 |
| | | | Pr | 1.0 | 1.0 | 1.0 |
| 2 | Cu—1.15% Cr | " | δ | 0.1037 | 0.1297 | 0.1459 |
| | | | σ$_B$ | 23.70 | 29.65 | 33.35 |
| | | | Pr | 1.0 | 1.251 | 1.407 |
| 3 | Cu—2.35% Fe—0.12% Zn—0.07% P | " | δ | 0.1099 | 0.1341 | 0.1492 |
| | | | σ$_B$ | 23.74 | 28.98 | 32.24 |
| | | | Pr | 1.0 | 1.220 | 1.357 |
| 4 | STEEL (0.12% C) | Aluminum (JISAC9B) | δ | 0.0815 | 0.0546 | 0.0378 |
| | | | σ$_B$ | 23.72 | 15.89 | 11.00 |
| | | | Pr | 1.0 | 0.670 | 1.357 |
| 5 | Cu—1.15% Cr | Aluminum (JISAC9B) | δ | 0.1176 | 0.1167 | 0.1161 |
| | | | σ$_B$ | 23.73 | 23.55 | 23.43 |
| | | | Pr | 1.0 | 0.993 | 0.987 |
| 6 | Cu—2.35% Fe—0.12% Zn—0.07% P | Aluminum (JISAC9B) | δ | 0.1298 | 0.1211 | 0.1194 |
| | | | σ$_B$ | 23.65 | 23.14 | 22.81 |
| | | | Pr | 1.0 | 0.978 | 0.965 |

δ: Interference (mm),
σ$_B$: Maximum Circumferential Stress (kgf/mm$^2$)
Pr: Radial Pressure (kgf/mm$^2$)

Conditions of calculation (1) Dimensions of bearing
Outer diameter: 56 mm
Thickness of back metal: 1.2 mm
Housing outside-inside ratio
(housing outer diameter/housing inner diameter):1.5

(2) Material of back metal

| Kind | Young's modulus | Poisson's ratio | Thermal expansion Coefficient |
|---|---|---|---|
| STEEL* (0.12% C) | 21000 | 0.30 | 12.0 E-6 |
| Cu—1.15% Cr | 13100 | 0.30 | 17.8 E-6 |
| Cu—2.35%* Fe—0.12% Zn—0.07% P | 12300 | 0.30 | 17.4 E-6 |

*wt %

(3) Material of housing

| Kind | Young's modulus | Poisson's ratio | Thermal expansion Coefficient |
|---|---|---|---|
| STEEL (0.12% C) | 21000 | 0.30 | 12.0 E-6 |
| Aluminum | 7600 | 0.33 | 18.0 E-6 |

TABLE 4

Conditions of high-speed DS-type seizure test
Conditions of test

| Conditions of test | Dimension | Unit |
|---|---|---|
| Shaft diameter | 53 | mm |
| Bearing width | 16 | mm |
| Rotational speed | 7200 | rpm |
| Circumferential speed | 20 | m/s |
| Lubricating oil | Machine oil 22 | — |
| Lubricating oil temperature | 100–110 | °C. |
| Oil feed rate | 150 | cc/min |
| Material of shaft | S55C | — |
| Roughness of shaft | 0.8 | Rmax μm |

What is claimed is:

1. A multi-layer sliding bearing adapted to be used for a light alloy housing, comprising an aluminum alloy bearing layer, and a back metal layer, said back metal layer being made of a copper alloy which has a thermal expansion coefficient of not less than $15 \times 10^{-6}$/°C., a 0.2% yield strength of not less than 295 N/mm$^2$ and a heat transfer coefficient of not less than 0.40 Cal/-cm•sec•°C.

2. A multi-layer sliding bearing according to claim 1, in which said bearing layer is made of one selected from the group consisting of an Al—Sn alloy, an Al—Zn alloy and an Al—Pb alloy.

3. A multilayer slide bearing, according to claim 2, further comprising an intermediate bonding layer interposed between said bearing layer and said copper alloy back metal layer, said intermediate bonding layer being made of aluminum or an aluminum alloy.

4. A multilayer sliding bearing according to claim 3, in which a Pb-alloy overlay layer is formed on a surface of said bearing layer, said Pb-alloy overlay layer containing at least one metal selected from the group consisting of Sn, In, Cu and Sb, and a total content of said at least one metal being 2% to 30%.

5. A multilayer sliding bearing according to claim 4, in which a flash plating layer having a thickness of 0.1 μm to 10 μm is formed on an entire surface of said sliding bearing, said flash plating layer being made of one selected from the group consisting of Sn, Pb and an alloy thereof.

6. A multilayer sliding bearing according to claim 5, wherein said aluminum alloy bearing layer consists of, by weight: at least one selected from the group consisting of Sn, Cu, Pb, Sb, Si and Zn; and the balance Al and incidental impurities being 5 to 30% in total.

7. A multilayer sliding bearing according to claim 2, further comprising an intermediate bonding layer interposed between said bearing layer and said copper alloy back metal layer, said intermediate bonding layer being made of Ni or a Ni alloy.

8. A multilayer sliding bearing according to claim 7, in which a Pb-alloy overlay layer is formed on a surface of said bearing layer, said Pb-alloy overlay layer containing at least one metal selected from the group consisting of Sn, In, Cu and Sb, and a total content of said at least one metal being 2% to 30%.

9. A multilayer sliding bearing according to claim 8, in which a flash plating layer having a thickness of 0.1 μm to 10 μm is formed on an entire surface of said sliding bearing, said flash plating layer being made of one selected from the group consisting of Sn, Pb and an alloy thereof.

10. A multilayer sliding bearing according to claim 9, wherein said aluminum alloy bearing layer consists of, by weight, at least one selected from the group consisting of Sn, Cu, Pb, Sb, Si and Zn; and the balance Al and incidental impurities being 5 to 30% in total.

11. A multi-layer sliding bearing according to claim 1, further comprising an intermediate bonding layer interposed between said bearing layer and said copper alloy back metal layer, said intermediate bonding layer being made of aluminum or an aluminum alloy.

12. A multi-layer sliding bearing according to claim 1, further comprising an intermediate bonding layer interposed between said bearing layer and said copper alloy back metal layer, said intermediate bonding layer being made of Ni or a Ni alloy.

13. A multi-layer sliding bearing according to claim 1, in which a Pb-alloy overlay layer is formed on a surface of said bearing layer, said Pb-alloy overlay layer containing at least one kind selected from the group consisting of Sn, In, Cu and Sb, and a total content of said at least one substance being 2% to 30%.

14. A multi-layer sliding bearing according to claim 1, in which a flash plating layer having a thickness of 0.1 μm to 10 μm is formed on an entire surface of said sliding bearing, said flash plating layer being made of one selected from the group consisting of Sn, Pb and an alloy thereof.

15. A multi-layer sliding bearing according to claim 1, wherein the aluminum alloy bearing layer consists, by weight, of: at least one of 5 to 30% in total selected from the group consisting of Sn, Cu, Pb, Sb, Si and Zn; and the balance Al and incidental impurities.

16. A multilayer sliding bearing to be used with a light alloy housing, comprising:
an aluminum alloy bearing layer being selected from the group consisting of an Al—Sn alloy, an Al—Zn alloy and an Al—Pb alloy;
a copper alloy back metal layer being selected from the group consisting of a Cu—Cr alloy, a Cu—Cd alloy, a Cu—Zr alloy, a Cu—Fe—P—Mg alloy, a Cu—Fe—P—Zn alloy, a Cu—Fe—Co—P—Sn alloy and a Cu—Ni—Si—Mg alloy, said copper alloy back metal layer having a thermal expansion coefficient of at least $15 \times 10^{-6}/°C.$, a 0.2% yield strength of at least 295 N/mm$^2$ and a heat transfer coefficient of at least 0.4 Cal/cm sec °C.; and
a Pb-alloy overlay layer formed on the surface of said aluminum alloy bearing layer and having a thickness on the order of about 20 μm, said Pb-alloy overlay layer comprising at least one metal selected from the group consisting of Sn, In, Cu and Sb, wherein a total content of said at least one metal is in the range of about 2% to 30%.

17. A multilayer sliding bearing according to claim 16, further comprising an intermediate bonding layer interposed between said bearing layer and said copper alloy back metal layer, said intermediate bonding layer being made of aluminum or an aluminum alloy, and wherein said aluminum alloy bearing layer being comprised of aluminum and a metal selected from the group consisting of Sb and Zn.

18. A multilayer sliding bearing according to claim 16, further comprising an intermediate bonding layer interposed between said bearing layer and said copper alloy back metal layer, said intermediate bonding layer being made of Ni or a Ni alloy, and wherein said aluminum alloy bearing layer being comprised of aluminum and a metal selected from the group consisting of Sb and Zn.

19. A multilayer sliding bearing to be used with a light alloy housing, comprising:
an aluminum alloy bearing layer being selected from the group consisting of an Al—Sn alloy, an Al—Zn alloy and an Al—Pb alloy, having a thickness on the order of about 0.25 mm;
a copper alloy back metal layer being selected from the group consisting of a Cu—Cr alloy, a Cu—Cd alloy, and Cu—Zr alloy, a Cu—Fe—P-Mg alloy, a Cu—Fe—P—Zn alloy, a Cu—Fe—Co-P-Sn alloy and a Cu—Ni—Si—Mg alloy, said copper alloy back metal layer having a thermal expansion coefficient of at least $15 \times 10^{-6}/°C.$, a 0.2% yield strength of at least 295 N/mm$^2$ and a heat transfer coefficient of at least 0.4 Cal/cm sec °C.

20. A multilayer sliding bearing according to claim 19, in which a flash plating layer having a thickness of 0.1 μm to 10 μm is formed on an entire surface of said sliding bearing, said flash plating layer being made of one selected from the group consisting of Sn, Pb and an alloy thereof.

* * * * *